United States Patent [19]
Thicthener et al.

[11] Patent Number: 5,567,374
[45] Date of Patent: Oct. 22, 1996

[54] POLYMERIC MOLDINGS REINFORCED WITH TOWS OF FIBERS

[75] Inventors: Edward P. Thicthener, West Lakes Shore; Peter J. Hastwell, North Adelaide, both of Australia

[73] Assignee: Applied Research of Australia, Pty. Ltd., Australia

[21] Appl. No.: 341,431

[22] Filed: Nov. 17, 1994

Related U.S. Application Data

[63] Continuation-in-part of Ser. No. 81,362, Jun. 30, 1993, abandoned.

[30] Foreign Application Priority Data

Nov. 1, 1991 [AU] Australia ................. PK9225
Oct. 30, 1992 [AU] Australia ................. 28899/92

[51] Int. Cl.$^6$ .................................................. B29C 70/52
[52] U.S. Cl. .................. 264/137; 156/166; 156/180; 156/441; 264/136; 264/257; 264/336
[58] Field of Search ............................. 264/134, 135, 264/136, 137, 257, 258, 336; 156/180, 441, 166

[56] References Cited

U.S. PATENT DOCUMENTS

| | | | |
|---|---|---|---|
| 2,949,054 | 8/1960 | White | 264/137 |
| 3,529,050 | 9/1970 | Smith | 264/137 |
| 3,859,409 | 1/1975 | Coonrod | 264/137 |
| 3,896,206 | 7/1975 | Beaver et al. | 264/137 |
| 4,780,166 | 10/1988 | Hunter | 264/137 |
| 5,114,516 | 5/1992 | Pilling et al. | 156/180 |
| 5,152,945 | 10/1992 | Thicthener et al. | 264/136 |
| 5,324,377 | 6/1994 | Davies | 264/137 |

*Primary Examiner*—Mathieu D. Vargot
*Attorney, Agent, or Firm*—Watts, Hoffmann, Fisher & Heinke Co

[57] ABSTRACT

Elongate products are molded in a die from fiber reinforced plastics by drawing a bundle of tows through a bath of resin and between two portions of an open die, which is closed under high pressure, and heated to cure the resin. The die is opened and the product is then partly withdrawn lengthwise, to draw further wetted tows between the die portions, and the die is again closed, clamping the tail end of the already cured product which still projects into the die space, or clamping blocks at its downstream end. Cold clamping blocks also clamp the tows at the die upstream end. The products are subsequently severed externally of the die by cutter wheels.

12 Claims, 6 Drawing Sheets

POLYMERIC MOLDINGS REINFORCED WITH TOWS OF FIBERS

This specification is a continuation in part of U.S. application Ser. No. 08/081,362, the "parent" specification, now abandoned.

BACKGROUND OF THE INVENTION

The original U.S. Pat. No. 5,152,945 was directed primarily to a means for and a method of forming a rock bolt of fiberglass reinforced plastics material (particularly a polyester formulation), but did not disclose any means for or method of rendering a rock bolt, electrically conductive. The parent specification discloses a method of rendering a rock bell electrically conductive, and disclosed a method of production of such a rock bolt. The method disclosed in that specification indicated the need to supply sufficient pressure to wetted tows to cause flow of resin into contact with bolt thread forming surfaces, and further disclosed applying chopped strand rainforced fluid but settable plastics mix to the wetted tows at the locality of a thread forming surface, before closure of dies. Further, the method disclosed forming a bolt with a shank, longer than the shank, forming surface of the dies by firstly forming a bolt with a shank equal to the length of the shank, forming surface, and withdrawing the threaded end outwardly from between the dies so as to form further wetted tows of a bundle between the shank forming cavities of the die end again closing the die to clamp portion of the shank end applying pressure to the wetted tows while the resin sets. Pressure was also indicated to be required to force resin to flow into close contact with thread forming surfaces, and protuberance recesses.

The parent specification disclosed (in FIG. 6) drawing a bundle of resin wetted fibers through an open die as a trailing extension of a premoulded product, and separating the moulded products externally of the die, This invention relates to the abovementioned method, and to further enhancements of the production method disclosed in the parent specification. In particular, there is a requirement which is frequently met of producing an elongate product of a length which is within a tolerance specified by a customer, and further, quite often there is a requirement for a fiber reinforced plastics product which is suitable for use as a reinforcement bar for reinforcing of concrete. This is particularly desirable (when prestressed) because of the much lower Yourigs modulus of FRP compared with steel which is otherwise used, and the second favourable characteristic of FRP is that of having a very high yield point, yield taking place close to the ultimate tensile strength of the product if in tension, Still further, when embodied in concrete, the corrosion problem which is encountered by steel is not encountered by plastics. This in turn simplifies the structure of a concrete beam, for example, because there is not the need for a thick overlay of concrete to nearly such an extent as occurs is with metal, to avoid "concrete cancer", that is, corrosion of steel within the concrete, with increase of volume causing further cracking and corrosion.

In an aspect of this invention, withdrawal of a precured product from an open die is only partial, the moulded tail end functioning as a "plug" at the downstream end of the die so as to enable high die pressures to be used. The degree of withdrawal can be varied, so that products can be moulded to varying lengths which are greater than the die length and in the case of concrete reinforcing bar, to a tolerance of one pitch of the protuberances on its outer surface.

The invention can be extended to other products, which are not necessarily of constant cross-sectional shape throughout their lengths, in those instances, wherein pad of the product length has a constant cross-section, products can be made to a very small length tolerance.

In many applications of fiberglass reinforced plastics (FRP) although the tensile strength may be adequate because it is imparted by the unidirectional fibers, the torsional strength is inadequate, and it is an object of this invention to provide a method of production of an elongate fiber reinforced product which has a more reliable torsional strength than products presently produced by known compression methods. In an aspect of this invention, entrained air is substantially removed from the product.

In both the original specification and in the parent specification some pressure was indicated as being desirable during the moulding of a rock bolt, in order to cause a flow of resin through the fibers into cavities defined by the die surfaces, but nevertheless with the relatively small pressures which were contemplated at the time that specification was prepared, a consistent torsional strength was difficult to obtain. However, it has been found that by increasing the pressures to pressures greater than 200 psi (1400 kPa) for low viscosity resin, below 500 centipoise, the air inclusion which frequently occurs in products made from wetted tows, is eliminated, or greatly reduced, and what would otherwise be unwet fibers are fully wetted, so that there is no discontinuity of resin at that point, which otherwise occurs if very low pressures are used. Desirably the pressures exceed 500 psi (3500 kPa) for viscosities up to 2000 centipoise and 700 psi (5000 kPa) for viscosities above 5000 centipoise, or for densely packed fibers. Efforts have been made by the inventors to get even higher pressures. It is believed that under those pressures the air actually dissolves in the resin, but does not appear to have any deleterious effect on the shear strength of the resin which is relevant to the torsional strength of the product.

A problem which is encountered if high pressure is used in moulding a fiber reinforced product is that the resin tends to be extruded from the ends of a die through which the product extends. If that extrusion takes place at the upstream end of a hot die, a bulbous knob of set resin will form which needs to be removed, and that operation is not viable for production of continuous uniform length products.

With the object of inhibiting extrusion of resin through die ends and preventing a bulbous knob from forming at the entry end of the die, in an embodiment of this invention, use is made of clamping means comprised in the die, and having a cold surface at the upstream end of the die, the clamping means preferably being separate blocks appended to the die ends, while obviously they can be constituted by portion of the die itself at the upstream end, if it is kept water cooled.

In most applications of fiber reinforced tensioning members, bolts and reinforcing bar, tensile strength is the most desirable feature, and the tensile strength is largely a function of the amount of reinforcing fiber which exists in a given cross-sectional area in a product. For that reason, it is an object of this invention to provide improvements whereby the ratio of fibers to resin is much higher than what has been commercially produced previously, achieved by using the abovementioned higher pressures.

BRIEF SUMMARY OF THE INVENTION

In this invention, production of elongate moulded products of settable resin reinforced with fibers comprises the steps of drawing a bundle of fibers through a bath of fluid but settable resin mix and between cavities of die portions of an open die, closing the open die under pressure to form the shape of the required product, applying heat and maintaining pressure to cure the resin and form a product, partly withdrawing the product from the die lengthwise so as to introduce further tows and entrained resin between the cavities of the open die, producing subsequent products successively each by repetition of those steps, and severing the moulded products from one another externally of the die. The cured product may be clamped by a spring loaded clamping block where it projects at the downstream end of the die, and the wetted tows adjacent the upstream end of the die clamped between cold surfaces with sufficient force to inhibit resin expulsion from the die.

In this invention, cold surfaces are used at the upstream end so that, notwithstanding restriction against expulsion, if any resin is expelled through the upstream end, that resin is not heated as the resin within the dies is heated, and therefore remains in a fluid state in the tows as they are drawn through the dies to produce a subsequent product. In a further embodiment of the invention, the cold clamping surfaces at the upstream end are surfaces of a pair of water cooled metal clamping blocks which come together upon closure of the dies, and are separated from the hot portions of the die ends by means of a heat insulating separator pad. There is no need to water cool the clamping blocks at the downstream end of the dies, since the clamping blocks (which form portions of the die portions) only engage cured material, or in extreme conditions, are themselves sufficiently hot to cure the resin.

In many other products which are likely to be produced, including both rock bolts and reinforcing bars, there is frequently a need for threaded ends. In a still further embodiment of the invention, at the downstream end of the die, there is provided a three part die portion for defining thread forming surfaces, two of the portions separating out laterally when the die is opened and the third portion being lifted away, and the length of the thread forming portion equals the combined lengths of two threads one at each end of a product, the first said product being separated from the second said product and so on by dividing the thread into two equal parts externally of the die.

By partial withdrawal only of a product after it has been cured in the dies, products can be made longer than the die length, as said above. No loss of strength has been found to exist due to curing of a shank portion to a trailing end of a previously cured shank portion. It becomes inconvenient if fibers wet with uncured resin extends beyond the die (including downstream clamps), and it is important that withdrawal of cured resin should be partial only, so that cured resin lies at least between the downstream clamps, (which are herein defined as being portions of the die ) and preferably extends into the cavity of the die. However, if the die cavity at the downstream end includes thread forming conformations, the cured resin should not extend into the cavity for the length of the thread when forming a thread, since moulding of uncured rosin over cured resin may fail to achieve full adhesion, when a thread forming mix is injected.

PRIOR ART

The U.S. Pat. No. 3,960,629 in the name of William Brandt GOLDSWORTHY disclosed a composite strand of thermosetting synthetic plastic resin reinforced with fibers and produced by a pultrusion machine and process. This constitutes the relevant prior art, but the die forming method of the Applicant's is not disclosed therein, nor is it disclosed elsewhere within the context of forming elongate moulded products under pressure and heat by producing the products successively and separating them subsequent to curing.

Other relevant prior art includes:

Australian patents 579703 (52431/86) Weldmann
586930 (76314/57) DuPont
487898 (74319/74) Titan A very large amount of literature exists on the application of fiberglass reinforced plastics as reinforcing bars for embedding in concrete. Reference is made harem to "International Encyclopedia of Composites", Volume 6, pages 173 to 186, which summarises usage of FRP reinforcing bars, and also provides an extensive list of references. (ISBNO-89573-736-1; VCR Publishers, New York, USA).

BRIEF SUMMARY OF THE DRAWINGS

An embodiment of the invention is described hereunder in some detail with reference to and is illustrated in the accompanying drawings in which.

DESCRIPTION Of PREFERRED EMBODIMENTS

Figure 1:
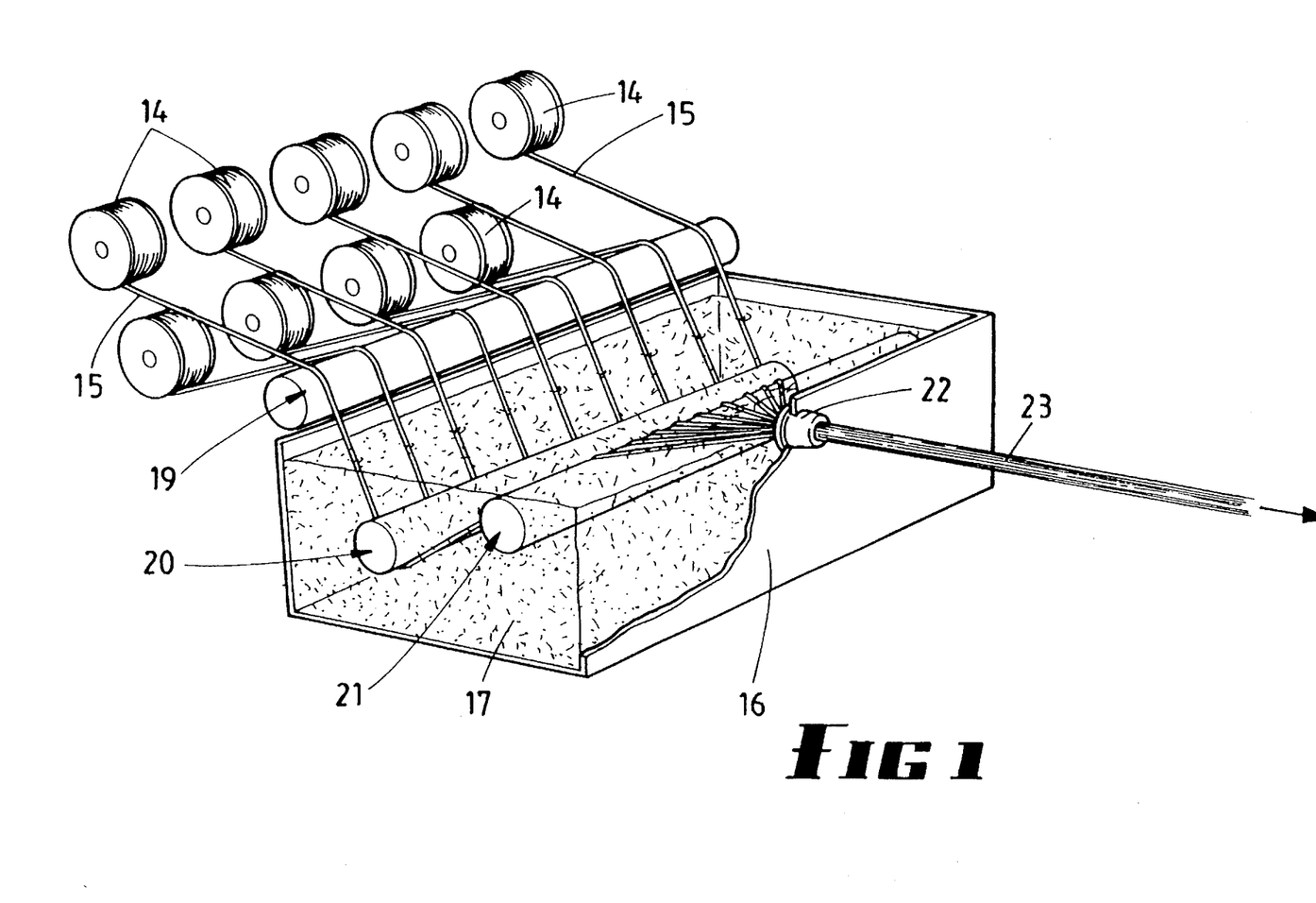
FIG. 1 shows the steps of drawing a bundle of fibers through a bath of fluid but settable resin mix.

Referring first to FIG. 1, a series of reels 14 carry fiberglass or other fiber strands 15 (carbon, or aramid "Kevlar") which pass through a bath 16 containing fluid but settable polyester resin 17, and pass over the three curved deflectors 19, 20 and 21 and into nozzle 22 to emerge as a bundle of tows 23.

Figure 2A:
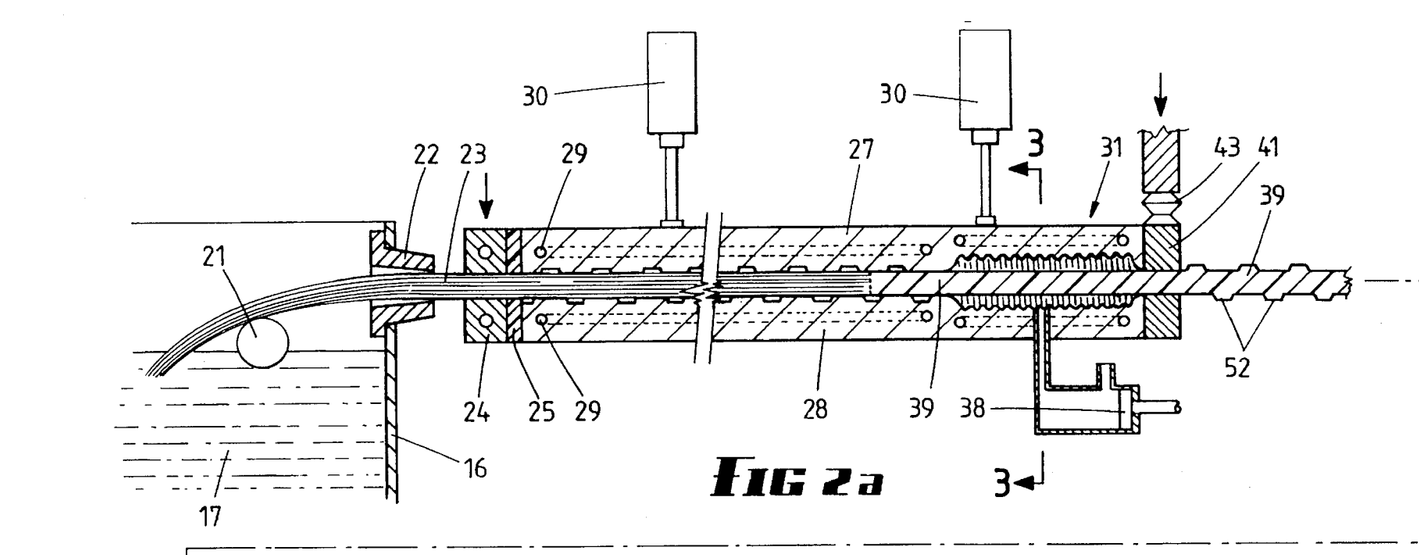
FIG. 2A shows the steps of closing die portions of a die to form a product, with the upstream end of the die closed by a water cooled clamping block and the downstream end of the relevant part of the die closed by the tail end of the previously moulded product.

From the nozzle 22, the bundle of tows 23 passes first through a pair of metal clamping blocks 24 cooled by waterway 26 as shown in FIG. 2A, then through a heat insulating separator pad 25 which in this embodiment is of PTFE ("Teflon") to which the resin is non adhesive. The bundle 23 is drawn through the then open die portions 27 and 28, the die portions being heated by embedded thermostatically controlled heating elements 29, and being closable by means of hydraulic rams 30 which are arranged to apply a projected area pressure of more than 200 psi (1400 kPa), but in this embodiment, the pressure is in the order of 1000 psi (7 mPa).

Figure 2B:
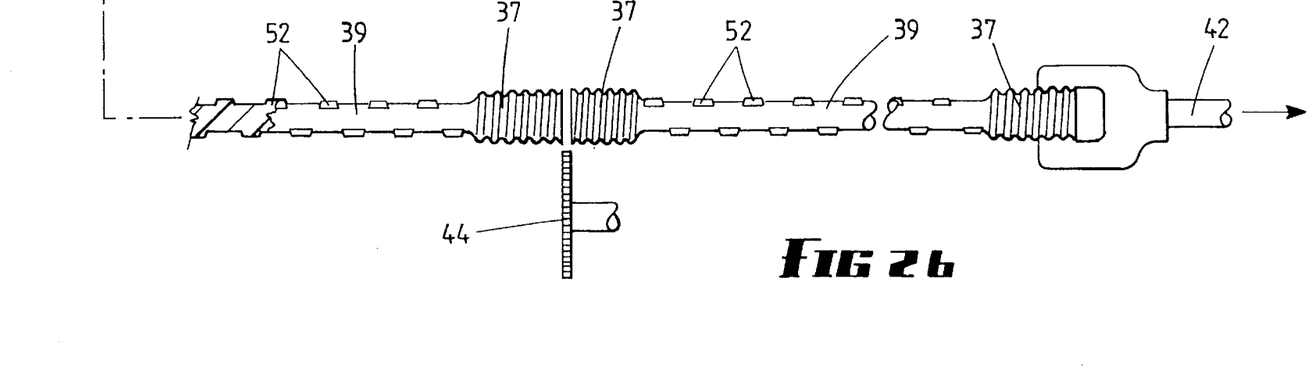
FIG. 2B is a continuation of FIG. 2A and illustrates the severing of previously moulded products externally of the die.
Figure 3:
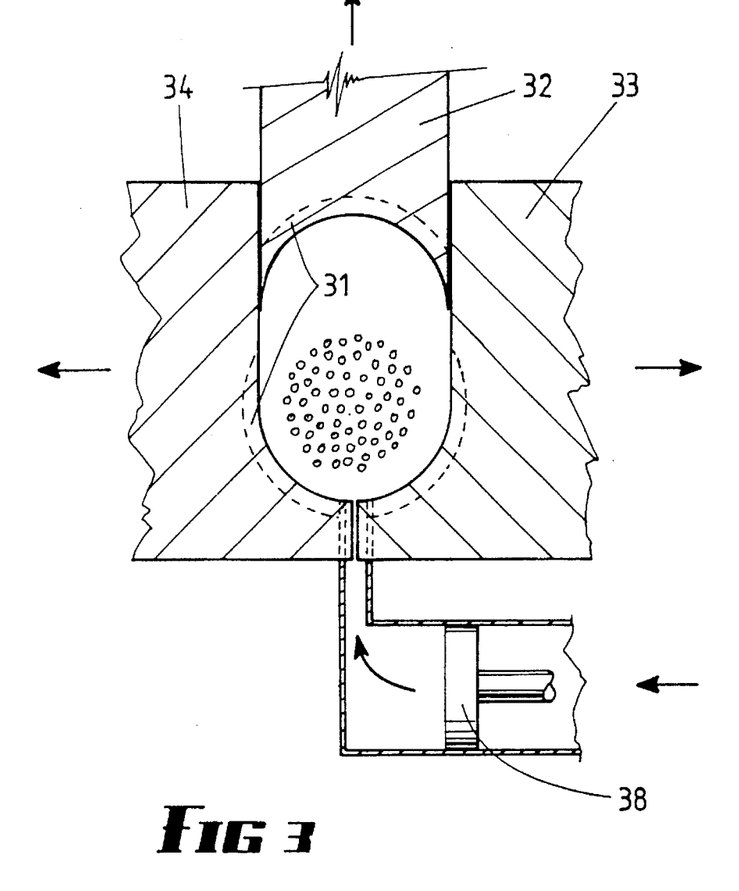
FIG. 3 is a section taken on plane 3—3 of FIG. 2A and showing the three part die at the thread forming locality at the downstream end of the die, drawn to a larger scale.

As shown in FIG. 2A, adjacent the downstream end of the die there is a thread forming formation 31 which, as shown in FIG. 3, is constituted by an upper part 32, and two lower parts 33 and 34, and the lower parts are separable laterally to open the die while the upper part moves upwardly. The three part die portion is required because of the return surfaces of a thread when moulded. If a fully threaded rod is required, the entire length of the die needs to be three part. Alternatively, the circular shape shown In FIG. 2 may have parallel sides as shown in the parent specification.

The thread forming portion 31 and its die parts extend for double the length of a required thread 37 (FIG. 2B), and an accurately determined amount of thread forming resin is injected by an adjustable injection ram 38. In order to provide a strong thread, not only is the pitch diameter made greater than the outside diameter of the shank 39 of a reinforcing bar, but the thread mix is of stronger material. Use can, for example, be made of chopped fiberglass strand embodied in a high strength resin (in this embodiment, using 20 parts of chopped strand glass fibers to 100 parts of resin). In this embodiment, the resin used in the shank was a relatively inexpensive resin (eg. an isophthalic resin having only 1% to 2% elongation). However, the thread resin is a bow Chemical 'Derakene 411 vinyl ester' having a 4% to 5% elongation.

The use of continuous bulked roving still further increases the thread strength. Bulked roving is a texturized product which incorporates transverse filaments in addition to axis-oriented filaments, and is produced by PPG industries Inc., Fiber Glass Products, One PPG Place, Pittsburgh, Pa., USA.

The reinforcing bar which is shown to be produced in FIGS. 2A and 2B is an elongate bar, and the length is determined by the number of portions which are moulded in succession within the shank forming part of the die. The bundle of tows is drawn through the separated die portions 27 and 28, and the die is closed, the upstream and downstream projecting ends of the tows being clamped to avoid excessive resin expulsion. Thread composition is injected to form a thread adjacent the downstream clamping blocks 41, the clamping blocks 41 enabling high pressure to be used to produce a first moulding, as well as all successive mouldings. The die portions are separated and the three part die of FIG. 3 is also opened and the cured product is withdrawn from the die portions by the puller 42, until the cured end of shank 39 is located slightly upstream of the thread forming formation 31, and this then functions as a plug to prevent extrusion of resin from the downstream end. Formed protuberances 52 (if any) must register in the die recesses. The shank length is then extended by closing the die portions and setting the resin entrained by the tows in the bundle 23 upstream of the set portion of the shank 39, without forming further threads. The distance the set portion of shank 39 penetrates the die cavity upstream of the thread forming formation 31 will determine the final length of the reinforcing bar. This is controlled by controlling the distance of the set portion of shank 39.

During curing of the resin, there is a small change in volume, and therefore the upper die portion 27 will move accordingly in a vertical direction, maintaining pressure on the product during the curing period. The downstream clamping blocks 41 are required to clamp the previously cured tail end of a formerly moulded product to inhibit resin extrusion, and therefore is spring loaded downwardly by Bellville springs 43.

Assuming that one more closure of the dies is required for the complete bar which may be much longer than the die, the third closure occurs when the shank has been withdrawn further by the puller 42, and for the third closure thread forming mix is again injected by the injection ram 38.

The product is again withdrawn from the dies after the die portions have been separated, and successive products are made in much the same way. The thread 37 is separated in halves by the cutting wheel 44 as shown in FIG. 2B, leaving the left hand end of shank 39 remaining in the die space, and the process is repeated for successive products.

As best seen in FIG. 3, the lower die portion 28 has a 'U' shaped cross-section slot, the side walls containing fibers against separation when pressing. This in turn enables a larger content of reinforcing fiber, and for example, the Applicant has been successful in producing a bar with glass fibers contributing more than 80% of the weight, and resin less than 20%. Such densely packed tows require low viscosity resin, and require high pressure to be imparted to cause resin flow between the fibers, and into die recesses. Use of filler is at least reduced, if not eliminated in such instances.

Results are enhanced if some of the outer tows are of bulked rovings.

Figure 4:
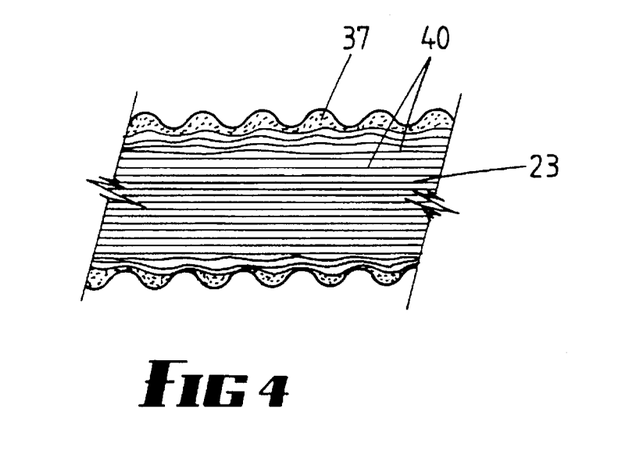
FIG. 4 illustrates the thread formation and the fiber formation at the locality of threads.

FIG. 4 illustrates to a larger scale the thread 37 with its higher elongation, higher strength resin content and its chopped strand fiber surrounding the bundle of tows 23. Since the thread is of larger pitch diameter and since it completely surrounds the bundle of tows 23, which otherwise set to form shank 39, if the composite plastic reinforcing bar is to be prestressed, the thread strength will be at least 45% of the ultimate tensile strength of the shank, since prestressing to 40% of the ultimate tensile stress is recommended. Furthermore, because of the relatively high degree of elongation available within the workable range of tensile forces, use can be made of elongate nuts as described below to threadably engage a greater number of threads and the load will be much more evenly spread than in the case of, say, a steel thread where most of the load is taken by one or two threads. The small deformations of the outer axial fibers 40, shown in FIG. 4, has a significant effect on thread strength.

Figure 5:
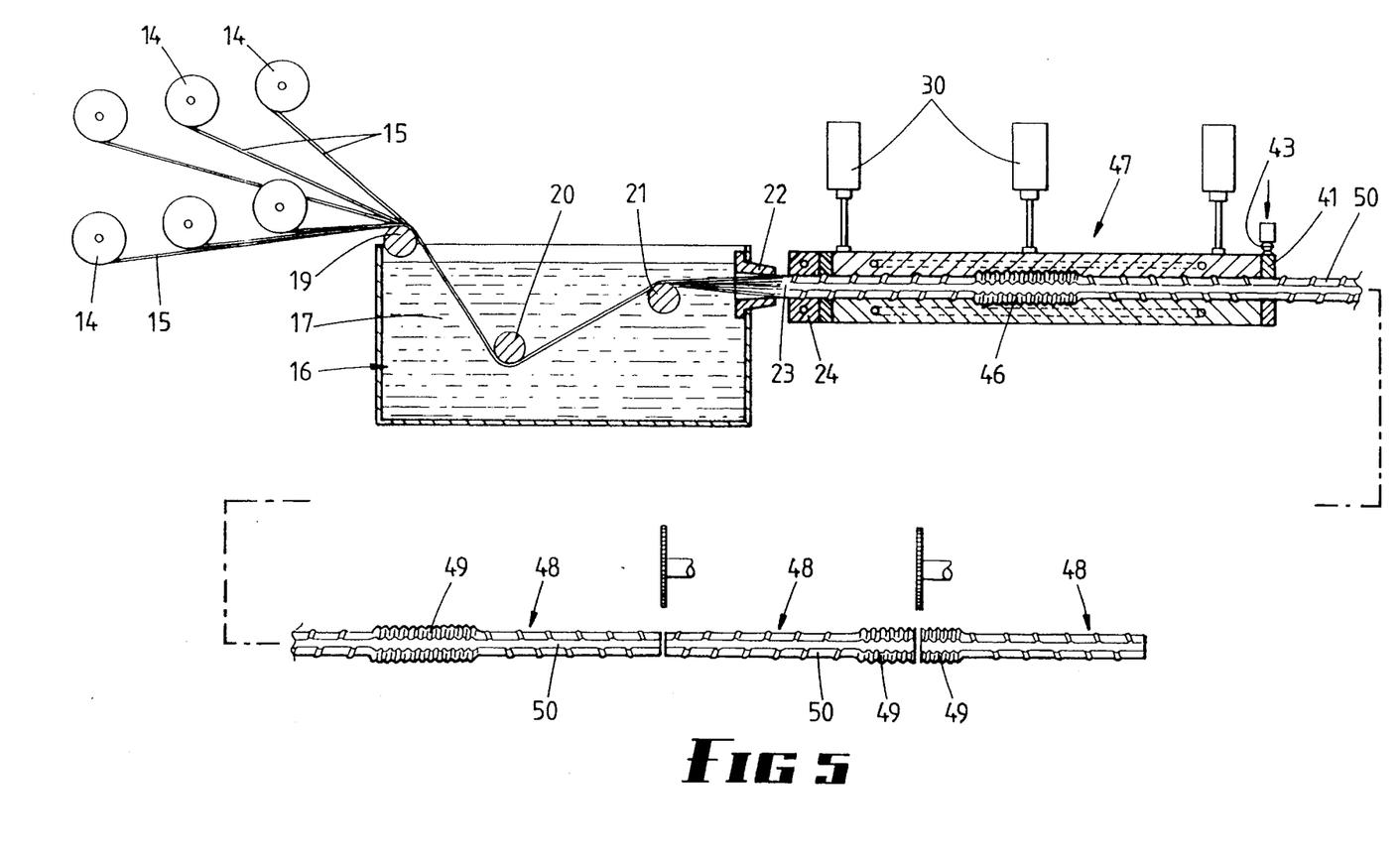
FIG. 5 is a view similar to FIGS. 2A and 2B, but showing rock bolts being formed two at a time with the thread forming portion of the die central between its upstream and downstream ends.

Reference is now made to FIG. 5 which is otherwise illustrated in the parent specification, and FIG. 5 differs from the embodiment of FIGS. 2A, 2B and 3, in that the thread forming formation 46 is located centrally of the die assembly 47, and two rock bolts 48 may be moulded simultaneously, subsequently severed by wheels 44. The threads 49 and the shanks 50 are otherwise similar to what is shown in FIGS. 2A and 2B. Use is made of the cold clamping blocks 24 at the upstream end of the die assembly 47, and at the downstream end clamping blocks 41 are spring loaded by Bellville springs 43 as in the first described embodiment.

In both embodiments, no attempt is made or is necessary to be made in most instances for the thread strength to equal the tensile strength of the shank, although the thread must be capable of prestressing a reinforcing bar to 40% of its ultimate tensile strength. The reinforcing bar which is illustrated in FIGS. 2A and 2B is provided with a plurality of protuberances 52, and these protuberances may be spaced for example 20 mm apart. In that instance, it is necessary for the length to be determined within a 20 mm pitch tolerance, but when the bar is embodied in concrete, protuberances 52 lock the bar for the entire length of the concrete. Thus it is desirable that some prestressing be imparted. Once the concrete has set, the load on the nuts is not excessively increased upon loading of the concrete because of the locking effect of the protuberances 52.

Figure 6:
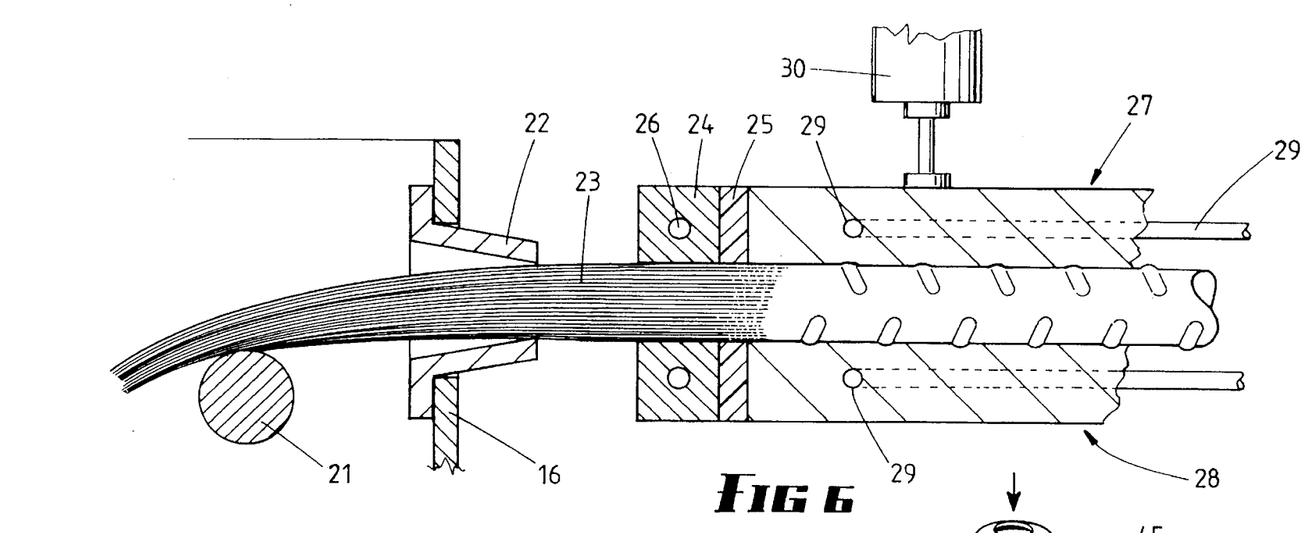
FIG. 6 shows to a larger scale the detail of the cold blocks which are otherwise illustrated in FIGS. 2A and 5.
Figure 7:
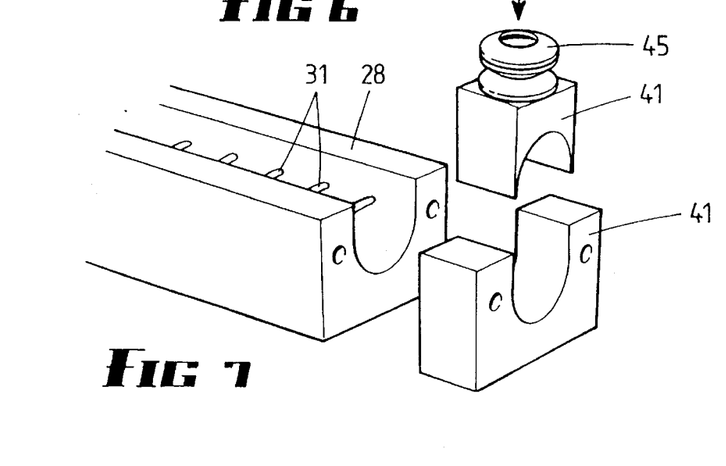
FIG. 7 is a fragmentary "exploded" view of the downstream end clamping blocks.

However, in the case of a rock bolt with point anchor, the thread may be required to support a heavier load, and this can be imparted simply by increasing pitch diameter, increasing bulked roving content or both, FIG. 6 is a larger scale representation of the upstream clamping blocks 24 and the insulating pad 25, and FIGS. 2a and 7 in addition show spring 43 at the downstream end, which retains high pressure notwithstanding expansion or contraction of the bundle of tows 23, upon heating and subsequent cooling.

Figure 8:
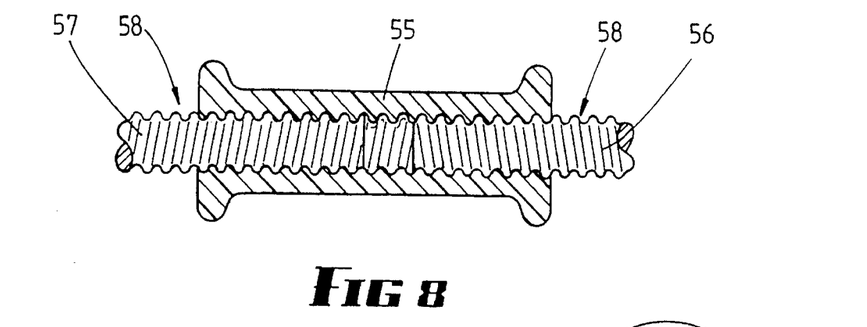
FIG. 8 shows a joining of continuously threaded reinforcing bars by means of 8 turnbuckle nut.

Sometimes there is a requirement for a use of a turnbuckle on a reinforcing bar, for example, of continuous threaded rod, and FIG. 8 shows a turnbuckle nut 55 engaging a right hand thread 56 at the right hand side and the left hand thread 57 at the left hand side of respective moulded continuously threaded rods 58.

Figures 9, 10:
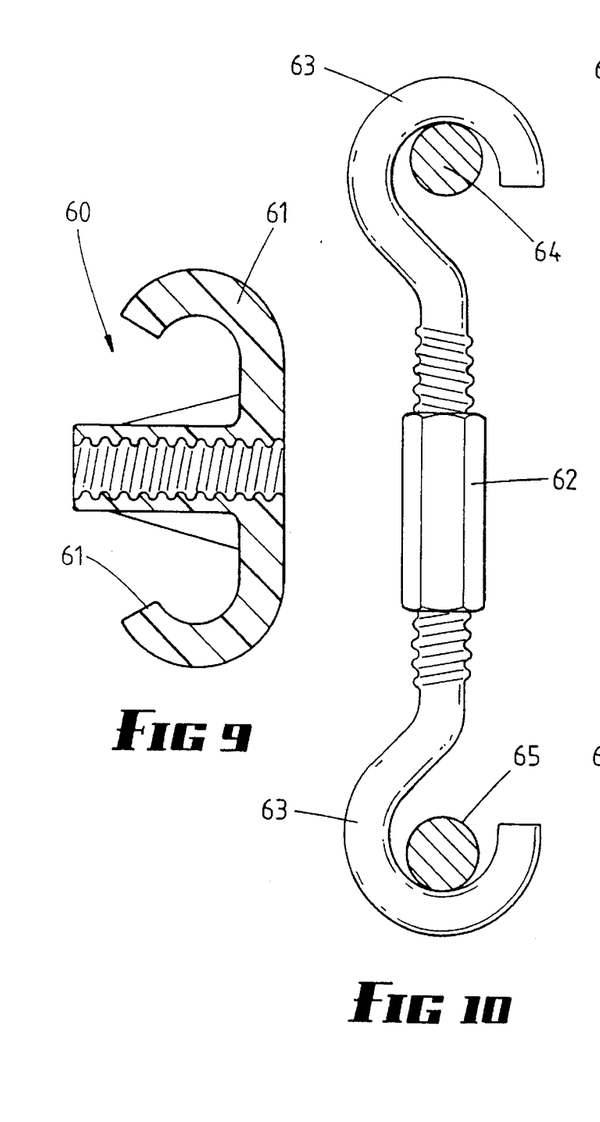
FIG. 9 shows a threaded end which could be useful in retaining the ends of a reinforcing bar in concrete.
FIG. 10 shows one form of hook arrangement again using a turnbuckle nut, for positioning upper and lower reinforcing bars.

When a composite thermoset reinforcing bar is used in concrete, it is not feasible to bend the ends, as in the case of steel, and use may be made of the moulded flanged end member 60 which is illustrated in FIG. 9, which is provided with retention hooks 61.

In many installations of concrete, there is need for both upper and lower reinforcings, and these are usually retained in their separate locations by means of wired in stirrups. FIG. 10 illustrates a turnbuckle sleeve 62 which threadably engages right and left hand threads of respective hooks 63 for engaging upper and lower reinforcing rods 64 and 65.

Figure 11:
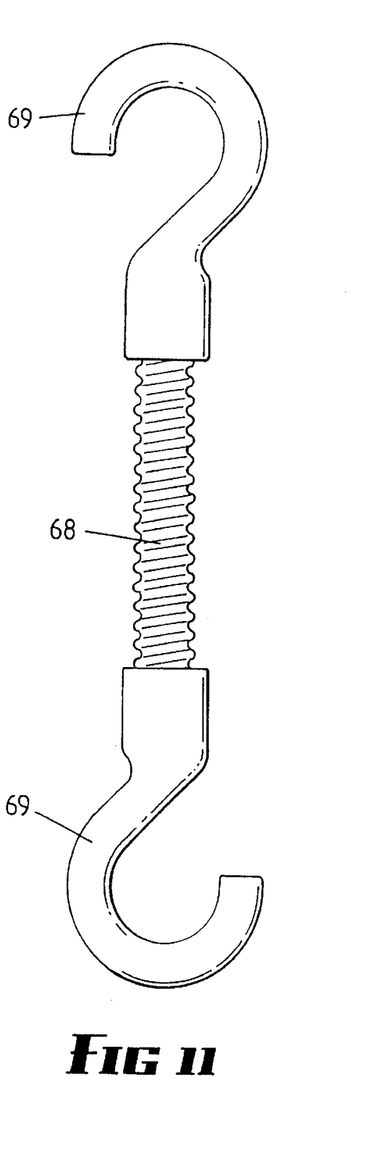
FIG. 11 shows an alternative arrangement wherein a length of threaded reinforcing bar terminates at its ends in upper and lower hooks.

FIG. 11 illustrates an alternative arrangement wherein a length of continuously threaded reinforcing bar 68 is cut to length and engages female threads in the hooks 69 for the same purpose.

The following tests confirm the effectiveness of bulked roving via a via single ended ("normal") roving:

The following results were obtained by replacing the "normal" 4800 tex fiberglass with two 2400 tex bulked rovings in the bolt, ie one 4800 tex fiberglass tow was taken out and replaced with two 2400 tex bulk rovings. Tax is the weight of 1 kilometer of fiberglass, eg 4800 tex fiberglass weights 4.8 gms/meter, so that the replacement did not change the quantity of fiberglass in the bolt.

TECHNIQUE:

Torque

The bolt was placed in a custom built torque tester, which requires clamping the bolt by the flat sides at one end, the other end which clamped the bolt on the flat sides was free to rotate in ball bearings and incorporated a fixture to which a torque wrench is attached. The bolt was then twisted about the longitudinal axis until failure occurs.

Results

A normal bolt with no bulked rovings withstood 50–56 ft/lb torque. Replacement of outside 3 strands of the normal 4800 tex fiberglass with 6 strand of 2400 tex bulked roving achieved an average torque resistance of:

6 strands of 2400 tex bulked rovings 67 ft/lb
  12 strands of 2400 tex bulked rovings 70 ft/lb
  18 strands of 2400 tex bulked rovings 73 ft/lb The bulked roving increase the torque resistance by 3 ft/lbs per 6 strands of 2400 tex placed on the periphery of the bolt where it has the best effect.

Each of the bolts prior to being subjected to the torque test, was subjected to a tensile load where a nut was placed on the threaded section and placed in a universal tensile tester.

Two types of failure occurred: the thread stripped off the bolt (thread had insufficient shear strength) or the nut split (nut had insufficient hoop strength).

The normal nut/thread strength is 4–50 kN.

6 strands bulked roving replacement normal fiberglass—Average tensile Nut/thread 50.7 kN—2 nut failures out of 6

12 strands bulked roving replacement normal fiberglass—Average tensile Nut/thread 54.2 kN—2 nut failures out of 6

18 strands bulked roving replacement normal fiberglass—Average tensile Nut/thread 58 kN—6 nut failures out of 6

That is, bulked roving increased the thread strength which is shown by increase in the ultimate tension load that the thread/nut will withstand. The numerical increase in nut failure demonstrates the increasing shear strength of the thread caused by the use of the bulked roving.

It is also interesting to note the almost perfect linearity of the results.

TORQUE

6–12 tows bulk roving 3 ft/lbs increase
  12–18 tows bulk roving 3 ft/lbs increase

TENSILE

6–12 tows bulk roving 3.5 kN increase 12–18 tows bulk roving 3.8 kN increase

A consideration of the above factors will also indicate the invention makes possible for the first time known to the. Applicant a production method for producing resilient strong rock bolts which meet all criteria presently known to the Applicant and which can be produced for relatively low cost since the bolt shanks can embody large quantities of inexpensive filler. The invention is further applicable to products of fiber reinforced plastics other than rock bolts and reinforcing bars wherein polymer products are required.

Reinforcing bars and other elongate products can be produced in continuous lengths, with or without threads, and with unidirectional fibers. This can be achieved with short, fixed length dies.

We claim:

1. A method of forming a plurality of elongate molded products of settable resin reinforced with fibers, comprising the following steps:

(a) drawing a bundle of tows of fibers through a bath of fluid settable resin mix and between cavities of die portions of an open die, (b) applying pressure to close the die portions to conform the shape of said tows and said resin entrained and wetted thereby to the shapes of surfaces which define said cavities, retaining pressure on said tows and applying heat to said die portions to accelerate curing of said resin therebetween, (c) opening said die portions and partially withdrawing a molded product lengthwise therefrom, thereby drawing a further bundle of tows wetted with said resin between said die cavities, the further bundle of wetted tows being a trailing extension of said molded product, (d) repeating said steps (b) and (c) to form successive molded products, and (e) separating said molded products externally of the die.

2. A method according to claim 1 further comprising clamping a bundle of tows between unheated surfaces at the upstream end of said die with sufficient force to inhibit expulsion of resin from said die cavities at the upstream end when said die portions close.

3. A method according to claim 2 wherein said unheated surfaces are surfaces of metal clamping blocks comprised in the upstream ends of respective said die portions, and further comprising water cooling said clamping blocks.

4. A method according to claim 1 further comprising clamping a portion of a partially withdrawn molded product the resin of which has been at least partially cured during step (b) of claim 1, between surfaces at the downstream end of said dies with a sufficient clamping pressure to inhibit expulsion of resin from said die cavities at the downstream end when said die portions close.

5. A method according to claim 4 wherein said downstream end clamping surfaces are surfaces of metal clamping blocks comprised in downstream ends of respective said die portions, and further comprising applying said clamping pressure by spring loading at least one of said blocks to retain said clamping pressure during the curing of resin in step (b) of claim 1.

6. A method according to claim 4 further comprising producing each of said molded products with a length exceeding a length of said die.

7. A method according to claim 1 further comprising retaining between said die portions a portion of a partially withdrawn molded product the resin of which has already been at least partially cured, and closing said die portions over said retained molded product portion to form a plug that inhibits expulsion of resin from said die cavities at the downstream end of said die.

8. A method according to claim 1 wherein said products are fiber reinforced plastics concrete reinforcing rods, further comprising forming said products to have protuberances spaced along their length, and separating the rods externally of the die into lengths by severing the rods.

9. A method according to claim 1 wherein said products are fiber reinforced plastics concrete reinforcing rods, and wherein said cavity surfaces include relatively small diameter shank forming surfaces extending inwardly from the die upstream end and relatively large diameter thread forming surfaces extending inwardly from the die downstream end, further comprising molding a reinforcing rod in accordance with step (b) of claim 1, in the entire length of said die, to have a thread at the downstream end of said shank, at least once partially withdrawing said product, retaining a cured portion of said resin between said shank forming surfaces, molding wetted tows in said die in accordance with step (b) to extend a length of the shank of said product, at least partially withdrawing said product from said die to dispose a cured portion of said resin only at a downstream end of said die, molding wetted tows in said die in accordance with step (b) and simultaneously injecting a thread forming resin mix into a space surrounding a downstream end of said wetted tows and defined by said thread forming surfaces, removing said product from the die and severing said molded products by cutting through the threads, such that each reinforcing rod has a shank with a thread at each end.

10. A method according to claim 1 wherein said products are fiber reinforced plastics rock bolts, further comprising molding two rock bolts end-to-end simultaneously in a die in accordance with step (b) to have shanks extending both upstream and downstream from a central threaded portion, partially withdrawing said rock bolts in accordance with step (c), and separating said rock bolts from each other by severing shanks and threads.

11. A method of forming a plurality of elongate molded products of settable resin reinforced with fibers, comprising the following steps:

(a) drawing a bundle of tows of fibers through a bath of a settable resin to coat said tows with said resin, (b) drawing said coated bundle of tows into die cavities defined by a die, (c) applying pressure to said coated bundle of tows in the die to conform said coated bundle of tows to the shape of said cavities, (d) at least partially curing said resin to form a first molded product, (e) partially removing said first molded product from the die to form a plug in the die, (f) drawing into the die cavities a further bundle of tows coated with said resin, (g) applying pressure to said further coated bundle of tows, while inhibiting expulsion of resin from the die with a plug in the die, to conform said further coated bundle of tows to the shape of said die cavities, (h) at least partially curing said resin to form a further molded product as an extension of a previously molded product, and (i) removing molded products from the die.

12. A method according to claim 11 further comprising partially removing said further molded product from the die to form a plug in the die and repeating steps (f) through (h).

* * * * *